United States Patent Office 3,708,452
Patented Jan. 2, 1973

3,708,452
HYDROGEL OF UNSATURATED POLYESTER RESIN AND UNSATURATED CARBOXYLIC ACID POLYMER SALT, AND HARDENED COMPOSITES THEREOF
Tsuneo Tsubakimoto and Masao Nikki, Toyonaka-shi, and Norio Mizuta, Kobe-shi, Japan, assignors to Nippon Shokubai Kagaku Kogyo Co., Ltd., Osaka, Japan
No Drawing. Filed Sept. 24, 1970, Ser. No. 75,295
Claims priority, application Japan, Sept. 25, 1969, 44/75,784; Dec. 9, 1969, 44/98,302
Int. Cl. C08f 45/24
U.S. Cl. 260—29.6 NR
10 Claims

ABSTRACT OF THE DISCLOSURE

Hardened compound resin compositions comprising a finely divided, rubbery hydrogel of a polymer of a water-soluble salt of at least one carboxylic acid of the general formula, $$CH_2=C(R)COOH$$

(in which R is hydrogen atom or methyl group) in uniformly dispersed form and a hardened, unsaturated polyester resin is prepared by providing a water-in-oil emulsion composed of an aqueous solution of water-soluble salt of at least one carboxylic acid of the general formula, $$CH_2=C(R)COOH$$

(in which R is hydrogen atom or methyl group) as the aqueous phase and unsaturated polyester resin as the oil phase, and polymerizing and hardening the above emulsion in the presence of polymerization initiator for the water-soluble salt and a polymerization initiator for the unsaturated polyester resin.

---

This invention relates to hardened resinous composites and processes for preparation thereof.

More particularly, the invention relates to hardened resinous composites characterized in that a finely divided rubbery hydrous gel which is a polymer of water-soluble salt of at least one carboxylic acid represented by the general formula, $$CH_2=C(R)COOH$$

(in which R is hydrogen atom or methyl group) i.e. acrylic acid and/or methacrylic acid, is uniformly dispersed and maintained in a hardened composition of an unsaturated polyester resin, and also to the processes for preparation of hardened resinous composites as above-described, which comprises polymerizing a water-in-oil emulsion in which an aqueous solution of the above water-soluble salt forms the aqueous phase and the unsaturated polyester resin forms the oil phase. The hardened resinous composites show excellent performance in heat stability, impact resistance, dimensional stability, and adaptability to working such as sawing, planing and cutting.

A method of making hardened hydrous unsaturated polyester resin compositions in which fine water particles are uniformly dispersed and retained in hardened unsaturated polyester resin compositions is known. The method comprises polymerization of a water-in-oil emulsion formed by emulsifying water in an unsaturated polyester resin. However, the hardened resin compositions obtained by such method have a very serious defect in that the water in the hardened resin is evaporated as time passes, consequently causing notable shrinkage, curvature, distortion and like phenomena in the hardened resin.

Accordingly, the object of the invention is to provide hardened resin compositions free of such defect. Other objects and advantages of the invention will become apparent from the following description.

We have engaged in concentrated studies to accomplish the above object, and made the following discoveries: that a wall-in-oil emulsion composed of an aqueous solution of water-soluble salt of an acrylic acid and-or methacrylic acid as the aqueous phase and an unsaturated polyester resin as the oil phase gives hardened resinous composites in which a finely divided rubbery hydrous gel of the polymer of such water-soluble salt is uniformly dispersed and retained in the hardened unsaturated polyester resin, when polymerized and hardened; and that the rubbery hydrous gel imparts excellent properties to the hardened resinous composites, while the water in the rubbery hydrous gel effectively acts as a flameproofing agent without generating noxious gases, those properties being retainable semi-permanently, not changing with time passage. Furthermore we discovered that, in the preparation of hardened resinous composites by polymerizing and hardening the water-in-oil emulsion composed of the aqueous solution of a water-soluble salt of acrylic acid and/or methacrylic acid as the aqueous phase and an unsaturated polyester resin as the oil phase, the intended product is obtainable not only by single-stage polymerization and hardening of the emulsion, but also by the two-stage process in which first the aqueous phase of the emulsion is polymerized so that the polymer in the form of finely divided, rubbery hydrous gel is uniformly dispersed and retained in the oil phase, and then the oil phase is polymerized and hardened. We also discovered that, the oil phase of the above two-stage process in which the finely divided rubbery hydrous gel is uniformly dispersed and retained, i.e., the unsaturated polyester resin composition, can be stored for prolonged periods with stability, not showing any change with time passage, but giving the hardened resinous composites upon polymerization and hardening after the storage.

According to the invention, hardened resinous composites composed of a finely divided rubbery hydrous gel of the polymer of a water-soluble salt of acrylic acid and/or methacrylic acid uniformly dispersed and retained in a hardened unsaturated polyester resin are provided. The invention furthermore provides a process for making hardened resinous composites which comprises preparing a water-in-oil emulsion composed of an aqueous solution of a water-soluble salt of acrylic acid and/or methacrylic acid as the aqueous phase and an unsaturated polyester resin as the oil phase, and polymerizing and hardening the emulsion in the presence of polymerization initiator for the water-soluble salt, polymerization initiator for the resin, and optionally polymerization activator. The invention further provides a process for making hardened resinous composites, which comprises preparing a water-in-oil emulsion composed of an aqueous solution of a water-soluble salt of acrylic acid and/or methacrylic acid as the aqueous phase, and an unsaturated polyester resin as the oil phase, polymerizing the aqueous phase in the emulsion in the presence of a polymerization initiator for the water-soluble salt, uniformly dispersing and retaining the resulting polymer as a finely divided, rubbery hydrous gel in the oil phase, and thereafter polymerizing and hardening the oil phase in the presence of a polymerization initiator for the resin and optionally polymerization activator. The invention again provides a process for making hardened resinous composites which comprises preparing water-in-oil emulsion composed of an aqueous solution containing a water-soluble salt of acrylic acid and/or methacrylic acid and polymerization initiator of the water-soluble salt as the aqueous phase and an unsaturated polyester resin as the oil phase, polymerizing the aqueous phase in the emulsion, uniformly dispersing and retaining the resulting polymer as a finely divided, rubbery hydrous gel in the oil phase, adding and mixing with the oil phase a polymerization initiator for the resin and optionally polymerization activator, and polymerizing and hardening the oil phase.

According to the subject processes, hardened resinous composites in which the weight ratio of the hardened unsaturated polyester resin to the rubbery hydrous gel ranges approximately 80/20 to 20/80, the rubbery hydrous gel of approximately $0.1\mu$–$600\mu$ in diameter being uniformly dispersed in the resin, are obtained. The above weight ratio is easily adjustable by suitably selecting the ratios among the unsaturated polyester resin, water, and monomeric water-soluble salt of acrylic acid and/or methacrylic acid. Also the size of rubbery hydrous gel is adjustable by controlling the manner of dispersing the aqueous phase in oil phase, either finely or coarsely.

The aqueous phase of the water-in-oil emulsion is an aqueous solution of water-soluble salt of acrylic acid and/or methacrylic acid. The type of water-soluble salt is not critical, as long as it is water-soluble. Thus, various salts can be effectively used. For example, ammonium salts; salts of primary, secondary, and tertiary alkylamines such as methylamine, dimethylamine, and trimethylamine; salts of alkali metals such as lithium and sodium; salts of alkaline earth metals such as calcium and magnesium; and alkanolamine salts, may be named. More than one of such water-soluble salts may be used concurrently. The concentration of those monomeric water-soluble salts in the aqueous solution is variable over a wide range, such as from 10% by weight to saturation. In certain cases it is permissible to reduce the concentration to even below 10 wt. percent, depending on the required physical properties of the hardened resinous composites.

The aqueous solution of the water-soluble salt or salts of acrylic acid and/or methacrylic acid can be easily prepared by adding the salt or salts to water and dissolving them, or by reacting acrylic acid and/or methacrylic acid with an alkali compound in water. In such case, further water-soluble additives such as lower aliphatic alcohols, e.g., methanol, ethanol, propanol, etc.; lower ethers such as methyl ether; lower ketones such as dimethyl ketone; and inorganic salts such as sodium chloride, potassium sulfate, sodium sulfate, magnesium sulfate, etc., may be added to the system to be concurrently contained in the aqueous solution.

The oil phase of water-in-oil emulsion is an unsaturated polyester resin. The resin can be obtained by blending, with an unsaturated polyester chain resulting from esterification of at least one glycol, at least one unsaturated dibasic acid, and at least one saturated dibasic acid according to the accepted procedures, at least one polymerizable monomer which participates in the polymerization and harden as a crosslinking agent.

Examples of glycols to be employed in the preparation of the unsaturated polyester resin include ethylene glycol, diethylene glycol, triethylene glycol, propylene glycol, dipropylene glycol, tetramethylene glycol, hexamethylene glycol, 2,2-diethylpropanediol, 1,3-butenediol, 1,3-butylene glycol, 2,3-butylene glycol, and hydrogenated bisphenol A, etc. Examples of the unsaturated dibasic acids include maleic acid, maleic anhydride, fumaric acid, chloromaleic acid, citraconic acid, citroconic anhydride, mesaconic acid, itaconic acid, hexachloro-3,6-endomethylene-$\Delta^4$-tetrahydrophthalic acid (HET acid) and HET anhydride. As the saturated dibasic acids, succinic acid, adipic acid, methylglutaric anhydride, pimelic acid, sebacic acid, azelaic acid, phthalic anhydride, phthalic acid, tetrahydrophthalic acid, tetrachlorophthalic acid, isophthalic acid, and terephthalic acid may be named for example. The polymerizable monomers which are crosslinkable with the unsaturated polyester chain are the compounds which have at least one residual group of the formula, $CH_2=C<$, specific examples including styrene, chlorostyrene, dichlorostyrene, o-, m-, p-, and $\alpha$-methylstyrene, vinyltoluene, vinyl acetate, methyl acrylate, methylmethacrylate, diallyl phthalate, diallyl isophthalate, cyanuric triallyl, and diallybenzene phosphonate, etc.

Besides the foregoing glycols, and acids, alcohols such as allyl alcohol, methallyl alcohol, decyl alcohol, tetrahydrofurfuryl alcohol, glycerin, pentaerythritol and sorbitol, and other acids such as benzoic acid and stearic acid may be used during the preparation of the unsaturated polyester resin, as modifying agents.

Varieties of unsaturated polyester resins can be prepared, by changing the combinations and blend ratios of the glycols, unsaturated dibasic acids, saturated dibasic acids, polymerizable monomers as the crosslinking agent, alcohols, and/or acids as the modifier. This invention embraces use of all of such unsaturated polyester resins.

The water-in-oil emulsion is prepared by first gradually adding an aqueous solution of a water-soluble salt of acrylic acid and/or methacrylic acid to the unsaturated polyester resin, with stirring and/or shaking. Care should be taken that the water-in-oil emulsion does not become an oil-in-water emulsion. In the water-in-oil emulsion, the unsaturated polyester resin forms a continuous phase as the oil phase, and the aqueous solution of the water-soluble salt of acrylic acid and/or methacrylic acid as the aqueous phase is uniformly dispersed in the oil phase in finely divided form. The weight ratio of the aqueous phase to oil phase may range from 20/80 to 80/20, preferably 40/60 to 60/40, to accomplish the objects of this invention.

In the preparation of water-in-oil emulsion, one or more cationic, anionic, or non-ionic emulsifiers may be used if desired. Also the stability of water-in-oil emulsion is improved if a part of or all of the free carboxyl groups of the unsaturated polyester resin are neutralized with basic compounds, for example, compounds such as sodium hydroxide, ammonia, and ethanolamine. The emulsions meeting the objects of this invention may contain conventionally used additives in synthetic resin techniques, for example, plasticizers, dyestuffs, organic and inorganic fillers, agents rendering the plastic thixotropic, flameproofing agent, inorganic and organic fibers, woven fabrics and textiles thereof, etc.

The hardened resinous composites of this invention are formed by polymerizing the above water-in-oil emulsion. The polymerization is performed, in the presence of polymerization initiator for the water-soluble salt of acrylic acid and/or methacrylic acid, and a polymerization initiator for the unsaturated polyester resin, and optionally a polymerization activator, at 0–100° C., preferably 20–80° C. The polymerization may also be performed in two stages, i.e., first adding a polymerization initiator for the water-soluble salt to the water-in-oil emulsion and polymerizing said monomeric salt, thereby uniformly dispersing and retaining the resulting polymer as a finely divided, rubbery hydrous gel in the unsaturated polyester resin, and thereafter polymerizing the same system at 0–100° C., preferably 20–80° C., after addition of a polymerization initiator for the resin and optionally a polymerization activator therefor. Furthermore, it is also possible to add a polymerization initiator for water-soluble salt to the aqueous solution of the water-soluble salt of acrylic acid and/or methacrylic acid and dissolve the former in the latter during the preparation of water-in-oil emulsion. The obtained aqueous solution is added to the unsaturated polyester resin to form a water-in-oil emulsion, and the water-soluble salt is polymerized under optional heating of the emulsion. The formed polymer is uniformly dispersed and retained in the unsaturated polyester resin as a finely divided, rubbery hydrous gel. Then the whole system is polymerized at 0–100° C., preferably at 20–80° C., in the presence of polymerization initiator for the resin, and optionally a polymerization activator.

As the polymerization initiator for the water-soluble salt of acrylic acid and/or methacrylic acid, known water-soluble polymerization initiators can be effectively used. For example, potassium persulfate, ammonium persulfate, hydrogen peroxide are preferred. Also so-called "redox" type polymerization initiators in which such initiators as named above are combined with reducing agents such as ferrous salts, sulfites, etc., can be effectively used.

As the polymerization initiator for the unsaturated polyester resin and polymerization activator, conventional agents known for the purpose may be effectively used. For example, peroxides such as t-butyl hydroperoxide, cumene hydroperoxide, benzoyl peroxide, 2,4-dichlorobenzoyl peroxide, lauroyl peroxide, methyl ethyl ketone peroxide, hydroxyheptyl peroxide, cyclohexanone peroxide, etc.; nitriles such as azobisisobutyronitrile; aliphatic amines, aromatic amines, and metallic salts such as cobalt naphthenate, etc., can be effectively used.

According to a preferred embodiment of the subject process, an aqueous solution containing at least 10 wt. percent of a water-soluble salt of acrylic acid and/or methacrylic acid is added to the unsaturated polyester resin and stirred thoroughly to form a water-in-oil emulsion, and to this emulsion polymerization initiators for the water-soluble salt and unsaturated polyester resin are added and mixed. Then the system is maintained at 0–100° C. to be polymerized and hardened. According to another preferred embodiment, the water-in-oil emulsion is formed by thoroughly mixing an aqueous solution containing at least 10 wt. percent of the water-soluble salt and polymerization initiator for the salt, with the unsaturated polyester resin, optionally using an emulsifying agent. The emulsion is maintained at the polymerization temperature of 0–80° C. to cause polymerization of the water-soluble salt of acrylic acid and/or methacrylic acid, thereby uniformly dispersing and retaining the polymer as a finely divided, rubbery hydrous gel in the unsaturated polyester resin. Thereafter a polymerization initiator for the resin and optionally a polymerization activator are added to the system, which is subsequently maintained at 0°–100° C. to cause polymerization and hardening of the resin. According to the latter embodiment, the polymerization initiator added in the hardening procedure of the resin is that for the unsaturated polyester resin alone. This brings about such advantages that the operation is simplified, and the hardened resinous composites exhibits favorable performance when a reinforcing agent or filler is used concurrently, because no free water is present in the system. Furthermore, in the composition in an unhardened stage, i.e., that of the unsaturated polyester resin in which the rubbery, hydrous gel is uniformly dispersed, both the dispersion of the gel and unsaturated polyester resin are extremely stable. The stability can be further improved upon addition of a suitable quantity of a polymerization inhibitor. Thus the composition can be stored for long periods without detrimental effects, and therefore is convenient for handling.

The hardened resinous composites of the invention thus contain a rubbery hydrous gel, i.e., polymer of a water-soluble salt of acrylic acid and/or methacrylic acid, uniformly dispersed in the hardened unsaturated polyester resin. Therefore the composition exhibits excellent combustion resistance and impact resistance because the rubbery hydrous gel absorbs energy of impact externally exerted. Furthermore, the composition can be sawed and cut with edged tools such as a plane, knife, chisel, etc. with extreme ease. Also because the polymer of the water-soluble salt of acrylic acid and/or methacrylic acid strongly retains water, the favorable properties are semipermanent, showing no deterioration with time passage. Dimensional stability of the composition also is high.

The application of the subject process is indeed wide. For example, various parts, workable materials, tools, concrete, walls, etc. made of wood, metal, and synthetic resin rubber, can be daubed with the water-in-oil emulsion. Thus, upon hardening the daubed layer, a synthetic resin coating can be formed on those materials. Also seats, plates, foils, etc. can be made by using, for example, a mold release compound to inhibit adhesion of base with formed layer. Again, shaped products of practically any configuration can be formed from the water-in-oil emulsion according to known methods of shaping, such as flat sheet, corrugated sheet, spherical heads, goods of various contours, door frame, tubes, boxes, containers, shoe-lasts, etc. In that case, fibrous materials and/or fillers such as mica, lava, pumice, perlite, etc. for reinforcing purpose are used concurrently with advantage. Optional quantities of such filler can be used. In certain cases, it may be so great that the filler serves as the chief component of the goods, e.g., light weight construction sheet material, and the synthetic resin formed of the emulsion is present only as the binder thereof.

Hereinafter the invention will be explained in further detail with reference to working examples, in which parts are by weight.

EXAMPLE 1

| | Parts |
|---|---|
| Hydrogenated bis-phenol A | 120 |
| Neopentyl glycol | 57 |
| Isophthalic acid | 50 |
| Maleic anhydride | 69 |

A mixture of the above four components was esterified in a nitrogen gas current, at a reaction temperature of 200° C. After cooling, the ester was dissolved in 267 parts of styrene, to provide an unsaturated polyester resin, which will be hereinafter referred to as the resin (I).

Separately, 275 parts of an aqueous solution containing 95 parts of sodium acrylate and 5 parts of calcium acrylate were prepared. This is called the aqueous solution (I) of the water-soluble (monomer).

Fifty (50) parts of resin (I), 50 parts of the aqueous solution (I), and 5 parts of 20% solution of an emulsifier, "Emulgen 985," (product of Kao Atlas Co.) were mixed and thoroughly stirred for several minutes at room temperature to form water-in-oil emulsion. To the emulsion, 0.5 part of 2% aqueous solution of ammonium persulfate, 0.5 part of benzoyl peroxide, and 0.5 part of dimethylaniline were added and mixed, and the mixture was poured into a sheet mold and hardened at room temperature.

The obtained hardened resinous structure was milk-white in color, and could be easily worked, e.g. cut or shaven with knife, plane, etc., and sawed. The structure was subjected to self-fire extinguishing test in accordance with ASTM (American Society of Testing Materials) D–635–56T. The test piece of the structure could not be burned. The same test result was obtained as to the test piece four months after the molding.

EXAMPLE 2

To 150 parts of the aqueous solution (I) employed in Example 1, 5 parts of 20% aqueous solution of an emulsifier, "Neopelex powder 0.5" (product of Kao Atlas Co.) were added, and further 0.3 part of 2% aqueous solution of ammonium persulfate was added and dissolved. The obtained aqueous solution of the water-soluble salt was added to 150 parts of the resin (I) of Example 1, and thoroughly mixed for several minutes to form a water-in-oil emulsion. Approximately 30 minutes after the system was emulsified, the temperature of the system started to rise, reaching as high as 35° C. However, no change took place in the flowability of the mixture. After three months standing, the mixture showed no change in state of dispersion or viscosity.

To the above mixture, i.e., unsaturated polyester resin containing finely divided rubbery hydrous gel uniformly dispersed therein, 0.5 part of benzoyl peroxide and 0.1 part of dimethylaniline were added and mixed, and the system was poured into a sheet mold, to be polymerized and hardened at room temperature. The obtained hardened resinous composite was milk-white in color and had excellent luster. It could be easily worked, e.g., cut or shaven with knife, plane, etc., and sawed. The product did not burn in the self-fire extinguishing test in accordance with ASTM-D-635-56T. The test piece of hardened resinous composites showed no deterioration in the combustion resistance, after treated for 10 days at 50° C. and reduced pressure of 30 mm. Hg.

EXAMPLE 3

| | Parts |
|---|---|
| Propylene glycol | 80 |
| Phthalic anhydride | 74 |
| Maleic anhydride | 49 |

A mixture of above three components was esterified through the procedure similar to that of Example 1, and dissolved in 68 parts of styrene to form an unsaturated polyester resin [resin(II)].

Separately, a 15% aqueous solution of ammonium methacrylate was prepared, which is called aqueous solution (II) of the water-soluble salt.

To 45 parts of the above resin (II), 55 parts of the aqueous solution (II) were added, and thoroughly stirred at room temperature for several minutes by means of a homogenizing mixer, to form a water-in-oil emulsion. The emulsion was mixed with 0.3 part of 2% aqueous solution of potassium persulfate, 0.5 part of methyl ethyl ketone peroxide, and 0.05 part of dimethylaniline. Subsequently, a hardened resinous structure was prepared through the procedures similar to those of Example 1.

The structure was milk-white in color, showed excellent machinability and was incombustible.

EXAMPLE 4

To the water-in-oil emulsion obtained in Example 3, 0.3 part of 2% aqueous solution of potassium persulfate was added and mixed, and allowed to stand at room temperature. The temperature of the system started to rise and polymerization of ammonium methacrylate took place, forming a composition in which the above-formed polymer as a finely divided, rubbery hydrous gel was uniformly dispersed and retained in the unsaturated polyester resin. No change in flowability of the system took place, however, and the composition was stored for three months without any change in state of dispersion, viscosity, etc.

To the composition 0.5 part of methyl ethyl ketone peroxide and 0.05 part of dimethylaniline were added and mixed, and a hardened resinous material was prepared therefrom through the procedures as employed in Example 1.

The material was milk-white in color, showed excellent workability, and was incombustible, similarly to the structure of Example 1.

EXAMPLE 5

The esterified product in Example 1 was neutralized with triethanolamine, and dissolved in 267 parts of styrene to form an unsaturated polyester resin [resin (III)]. Fifty (50) parts of the aqueous solution (I) of water-soluble salt employed in Example 1 were added to 50 parts of resin (III), to form a water-in-oil emulsion under stirring. A hardened, resinous structure was made from the emulsion through the procedures as described in Example 1.

The structure was milk-white in color, had excellent workability and was incombustible, similarly to the structure of Example 1.

EXAMPLE 6

A 30 wt. percent aqueous solution of ammonium acrylate was prepared from acrylic acid and ammonium carbonate, and its pH was adjusted to 8.0. To 40 parts of this aqueous solution, 2 parts of 20% aqueous solution of ammonium persulfate was added. Immediately the solution was added to 60 parts of the resin (I) of Example 1, followed by stirring with a homogenizing mixer for several minutes, to form a water-in-oil emulsion. Approximately 30 minutes after the emulsifying, exothermic phenomenon due to polymerization of the ammounium acrylate started. After the phenomenon ceased, the system was allowed to stand for three months without showing any change in the state of dispersion, viscosity, etc.

To the obtained unsaturated polyester resin containing a rubbery hydrous gel as finely dispersed therein, 0.1 part of 6% cobalt naphthenate and 0.3 part of 55% methyl ethyl ketone peroxide were added, followed by the procedures as described in Example 1, to be polymerized and hardened. The hardened material was incombustible, similarly to the product of Example 1.

EXAMPLE 7

A 30 wt. percent aqueous solution of potassium methacrylate was prepared from methacrylic acid and potassium hydroxide. The solution had a pH of 7.5. After adding 2 parts of 5% aqueous solution of ammonium persulfate thereto, the solution was added to 50 parts of resin (I) of Example 1. The system was mixed and stirred to form a water-in-oil emulsion.

The potassium methacrylate was polymerized, thereby causing uniform dispersion and retention of the finely divided, rubbery hydrous gel in the unsaturated polyester resin. To the system then 1 part of benzoyl peroxide and 0.5 part of 6% dimethylaniline were added, followed by polymerization and hardening through the procedures as described in Example 1. The product had excellent surface luster and workability, and was incombustible.

EXAMPLE 8

A 50 wt. percent aqueous solution of monoethanolamine acrylate was prepared from acrylic acid and monoethanolamine. The pH of the solution was 8.7. Immediately after the addition of 1 part of 20% aqueous solution of ammonium persulfate, 45 parts of the resin (II) of Example 3 were added to the solution, followed by mixing and stirring with a homogenizing mixer, to form a water-in-oil emulsion. Approximately 20 minutes after the emulsifying, exothermic phenomenon due to polymerization of the acrylic acid monoethanolamine salt began. After termination of the phenomenon, 0.1 part of 6% cobalt naphthenate and 0.3 part of 55% methyl ethyl ketone peroxide were added to the system, which was subsequently polymerized and hardened at room temperature.

The obtained hardened resinous composite showed excellent workability and was incombustible.

We claim:

1. Hardened hydrous resinous composites consisting essentially of (1) finely divided rubbery hydrous gel containing not more than 90% by weight water and at least 10% by weight of a polymer of a water-soluble salt of at least one carboxylic acid of the formula

wherein R is a hydrogen atom or methyl group, and (2) a hardened unsaturated polyester resin derived from at least one glycol, at least one unsaturated dicarboxylic acid, at least one saturated dicarboxylic acid and at least one vinyl monomer, the weight ratio of said hardened polyester resin to said rubbery hydrous gel being within the range of from about 80/20 to about 20/80.

2. The hardened resinous composites of claim 1 wherein the diameter of said rubbery hydrous gel is from about 0.1 to about 600μ.

3. A process for the preparation of hardened hydrous resinous composites which comprises preparing a water-in-oil emulsion composed of 20–80% by weight of an aqueous solution containing at least 10% by weight of water-soluble salt of at least one carboxylic acid of the general formula $CH_2=C(R)COOH$, wherein R is a hydrogen atom or methyl group, as the aqueous phase, and 80–20% by weight of an unsaturated polyester resin derived from at least one glycol, at least one unsaturated dicarboxylic acid, at least one saturated dicarboxylic acid and at least one vinyl monomer, as the oil phase, and polymerizing and hardening said emulsion in the presence of a polymerization initiator for the water-soluble salt and a polymerization initiator for said unsaturated polyester resin.

4. The process of claim 3 wherein said water-soluble salt is an ammonium salt.

5. The process of claim 3 wherein said water-soluble salt is an alkylamine salt.

6. The process of claim 3 wherein said water-soluble salt is an alkali metal salt.

7. The process of claim 3 wherein said water-soluble salt is an alkaline earth metal salt.

8. The process of claim 3 wherein said water-soluble salt is an alkanolamine salt.

9. A process for the preparation of hardened hydrous resinous composites which comprises preparing a water-in-oil emulsion composed of 20–80% by weight of an aqueous solution containing at least 10% by weight of water-soluble salt of at least one carboxylic acid of the general formula $CH_2=C(R)COOH$, wherein R is a hydrogen atom or methyl group, as the aqueous phase, and 80–20% by weight of an unsaturated polyester resin derived from at least one glycol, at least one unsaturated dicarboxylic acid, at least one saturated diacrobxylic acid and at least one vinyl monomer, as the oil phase; adding a polymerization initiator for said water-soluble salt to said emulsion and causing polymerization of the aqueous phase, thereby uniformly dispersing and retaining the polymer of the water-soluble salt as finely divided, rubbery, hydrous gel, in the oil phase; adding a polymerization initiator for the unsaturated polyester resin, and polymerizing and hardening said resin.

10. A process for the preparation of hardened hydrous resinous composites which comprises preparing a water-in-oil emulsion composed of 20–80% by weight of an aqueous solution containing at least 10% by weight of water-soluble salt of at least one carboxylic acid of the general formula $CH_2=C(R)COOH$, wherein R is a hydrogen atom or methyl group, and a polymerization initiator for said water-soluble salt, as the aqueous phase, and 80–20% by weight of an unsaturated polyester resin derived from at least one glycol, at least one unsaturated dicarboxylic acid, at least one saturated dicarboxylic acid and at least one vinyl monomer, as the oil phase, polymerizing the aqueous phase thereby uniformly dispersing the polymer of said water-soluble salt as finely divided, rubbery, hydrous gel in the oil phase, thereafter adding a polymerization initiator for said unsaturated polyester resin, and polymerizing and hardening said resin.

References Cited

UNITED STATES PATENTS 3,335,102   8/1967   Bussell et al. _____ 260—861

HAROLD D. ANDERSON, Primary Examiner

U.S. Cl. X.R.

117—161 R; 260—22 CB, 40 R, 861, 863, 867, 869, 870, 872

UNITED STATES PATENT OFFICE
CERTIFICATE OF CORRECTION

Patent No. 3,708,452  Dated January 2, 1973

Inventor(s) Tsuneo TSUBAKIMOTO ET AL

It is certified that error appears in the above-identified patent and that said Letters Patent are hereby corrected as shown below:

In the Heading, insert patentees' Foreign Application Priority Information as follows:

-- Claims priority, application Japan, September 25, 1969, No. 44-75784/69; application Japan, December 9, 1969, No. 44-98302/69. --

Signed and sealed this 7th day of January 1975.

(SEAL)
Attest:

McCOY M. GIBSON JR.
Attesting Officer

C. MARSHALL DANN
Commissioner of Patents